(12) United States Patent
Sakamoto et al.

(10) Patent No.: US 12,221,513 B2
(45) Date of Patent: Feb. 11, 2025

(54) COPOLYMERIZED POLYESTER AND WATER DISPERSION

(71) Applicant: TOYOBO CO., LTD., Osaka (JP)

(72) Inventors: Koichi Sakamoto, Shiga (JP); Tadahiko Mikami, Shiga (JP); Yuji Iwashita, Shiga (JP); Katsuya Shimeno, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 577 days.

(21) Appl. No.: 17/290,393

(22) PCT Filed: Dec. 18, 2019

(86) PCT No.: PCT/JP2019/049628
§ 371 (c)(1),
(2) Date: Apr. 30, 2021

(87) PCT Pub. No.: WO2020/149082
PCT Pub. Date: Jul. 23, 2020

(65) Prior Publication Data
US 2021/0371581 A1    Dec. 2, 2021

(30) Foreign Application Priority Data
Jan. 17, 2019  (JP) ................. 2019-005882

(51) Int. Cl.
*C08G 63/199* (2006.01)
*C08J 3/07* (2006.01)

(52) U.S. Cl.
CPC ............. *C08G 63/199* (2013.01); *C08J 3/07* (2013.01); *C08J 2367/02* (2013.01)

(58) Field of Classification Search
CPC .................. C08G 63/199; C08J 3/07
See application file for complete search history.

(56) References Cited

U.S. PATENT DOCUMENTS

| 4,829,132 A | 5/1989 | Umemoto et al. |
| 11,312,880 B2 * | 4/2022 | Iwashita ............ C09D 167/02 |
| 2007/0213501 A1 | 9/2007 | Bruchmann et al. |
| 2010/0204388 A1 | 8/2010 | Marsh et al. |
| 2015/0051325 A1 * | 2/2015 | Konishi ............ C08K 5/3492 205/196 |
| 2017/0275492 A1 | 9/2017 | Zhou et al. |

FOREIGN PATENT DOCUMENTS

| CN | 107849230 | 3/2018 | |
| EP | 1 754 737 | 2/2007 | |
| EP | 1 788 049 | 5/2007 | |
| JP | 5-239196 | 9/1993 | |
| JP | 9-286968 | 11/1997 | |
| JP | 2008-501048 | 1/2008 | |
| JP | 2010-70613 | 4/2010 | |
| JP | 2015-147830 | 8/2015 | |
| WO | 03/035715 | 5/2003 | |
| WO | 2006/095901 | 9/2006 | |
| WO | WO-2014156344 A1 * | 10/2014 | ............. B32B 27/00 |
| WO | 2019/216093 | 11/2019 | |

OTHER PUBLICATIONS

International Search Report (ISR) issued Jan. 21, 2020 in International (PCT) Application No. PCT/JP2019/049628.
Examination Report issued Jan. 3, 2023 in corresponding Indian Patent Application No. 202147023098.
Extended European Search Report issued Jul. 10, 2023 in corresponding European Patent Application No. 23165491.4.
Extended European Search Report issued Sep. 21, 2022 in corresponding European Patent Application No. 19910839.0.

* cited by examiner

*Primary Examiner* — John M Cooney
*Assistant Examiner* — Jeffrey S Lenihan
(74) *Attorney, Agent, or Firm* — Wenderoth, Lind & Ponack, L.L.P.

(57) ABSTRACT

The present invention aims to provide a copolymerized polyester and a resin composition which are excellent in storage stability, water-resistant adhesion, processability, weathering resistance and leveling property. According to the present invention, there is provided a copolymerized polyester containing a polyvalent carboxylic acid component and a polyhydric alcohol component as copolymerization components, wherein, when a content of the polyvalent carboxylic acid component is taken as 100% by mole, a content of an alicyclic polyvalent carboxylic acid component is 50% by mole or more, and wherein the copolymerized polyester has an acid value of 170 to 1000 equivalents/$10^6$ g.

6 Claims, No Drawings

COPOLYMERIZED POLYESTER AND WATER DISPERSION

TECHNICAL FIELD

The present invention relates to a copolymerized polyester and a water dispersion. More particularly, it relates to a copolymerized polyester and a water dispersion which are excellent in storage stability, water-resistant adhesion, processability, weathering resistance and leveling property.

BACKGROUND ART

A copolymerized polyester has been widely used as a material of a resin composition which is used as coating agents, inks, adhesives, etc. A copolymerized polyester is usually constituted from polyvalent carboxylic acid and polyhydric alcohol. By appropriate selection and combination of the polyvalent carboxylic acid and polyhydric alcohol, flexibility and molecular weight size can be freely controlled. Therefore, a copolymerized polyester has been widely used in various uses such as the coating agents and adhesives.

Among them, a copolymerized polyester having alicyclic skeleton in a resin is excellent in processability and weathering resistance. Therefore, such copolymerized polyester has been used for paints with outdoor durability (for example, Patent Document 1).

PRIOR ART DOCUMENT

Patent Document

Patent Document 1: Japanese Patent Application Laid-Open (JP-A) No. 239196/93

DISCLOSURE OF THE INVENTION

Problem that the Invention is to Solve

However, environmental pollution and worsening of working environment due to organic solvents used for paints have been paid attention recently. Accordingly, a demand for an aqueous paint which contains little organic solvent has been increased worldwide. In the meantime, in order to stably disperse a hydrophobic polyester resin in an aqueous medium, it is necessary to add acid value to a framework of the resin. However, there is a problem that water-resistance of the resulting coat worsens when the acid value is too high.

The present invention has been achieved based on the problem in the prior art as such. Thus, an object of the present invention is to provide a copolymerized polyester useful as resin components which express stability for a long period upon water dispersion. A further object of the present invention is to provide a water dispersion of polyester resin which exhibits water-resistant adhesion and weathering resistance to a substrate under a condition wherein an exposure to moisture for a long period is expected, which exhibits processability (high flexing property) in a level similar to a high-molecular polyester, and which can form a coat excellent in leveling property.

Means for Solving the Problem

As a result of extensive investigations, the inventors of the present application have found that the above problem can be solved by the following means and achieved the present invention.

Thus, the present invention comprises the following constitutions.

A copolymerized polyester containing a polyvalent carboxylic acid component and a polyhydric alcohol component as copolymerization components, wherein, when a content of the polyvalent carboxylic acid component is taken as 100% by mole, a content of an alicyclic polyvalent carboxylic acid component is 50% by mole or more, and wherein the copolymerized polyester has an acid value of 170 to 1000 equivalents/$10^6$ g.

The alicyclic polyvalent carboxylic acid component is preferred to be 1,4-cyclohexane-dicarboxylic acid or tetrahydrophthalic anhydride.

A glass transition temperature of the copolymerized polyester is preferred to be 5° C. or lower.

A number-average molecular weight of the copolymerized polyester is preferred to be 10000 or less.

A water dispersion of copolymerized polyester, wherein the copolymerized polyester is dispersed in water.

Advantages of the Invention

The water dispersion which is prepared by using the copolymerized polyester of the present invention exhibits excellent weathering resistance, excellent leveling property, excellent processability (flexing property), excellent water-resistant adhesion and good storage stability. Therefore, the water dispersion is suitable as an aqueous paint for coating on metal substrates or plastic substrates.

BEST MODE FOR CARRYING OUT THE INVENTION

As hereunder, the present invention will be illustrated in detail.

<Copolymerized Polyester>

The water dispersion which is prepared by using the copolymerized polyester of the present invention (Hereinafter, it will be also referred to as just "water dispersion".) exhibits excellent weathering resistance, excellent leveling property, excellent processability, excellent water-resistant adhesion and good storage stability. Therefore, the water dispersion is suitable as an aqueous paint which is expected to be exposed to an outdoor environment after being coated. A smooth coat having high flexing property and high water resistance can be prepared from a product which is prepared by using the copolymerized polyester of the present invention.

The copolymerized polyester of the present invention is composed of a chemical structure which can be obtained by a polycondensation of a polyvalent carboxylic acid component with a polyhydric alcohol component. The polyvalent carboxylic acid component and the polyhydric alcohol component each consists of one or more selected component(s).

In 100% by mole of the total content of the polyvalent carboxylic acid component, a content of the alicyclic polyvalent carboxylic acid component is preferred to be 50% by mole or more, more preferred to be 60% by mole or more, further preferred to be 70% by mole or more, furthermore preferred to be 80% by mole or more, and particularly preferred to be 90% by mole or more. It may be even 100% by mole. When the alicyclic polyvalent carboxylic acid is abundantly used, leveling property of water dispersion which is prepared by using the copolymerized polyester becomes excellent, and processability and weathering resistance of the coat tend to become high. When an acid anhydride etc. is added after the polymerization of the copolymerized polyester (i.e. acid addition) for adding the acid value, there may be a case wherein a total amount of the polyvalent carboxylic acid component and polyhydric alcohol component exceeds 200% by mole. In this case, a total amount of the composition except for the components such as the acid anhydride etc. which have been added after the polymerization of the copolymerized polyester is taken as 200% by mole, and the calculation is conducted based thereon.

The alicyclic polyvalent carboxylic acid constituting copolymerized polyester of the present invention is preferred to be alicyclic dicarboxylic acid. Although the alicyclic dicarboxylic is not particularly limited, there may be exemplified 1,4-cyclohexane-dicarboxylic acid, 1,3-cyclohexane-dicarboxylic acid, tetrahydrophthalic acid, methyl tetrahydrophthalic acid, tetrahydrophthalic anhydride, methyl tetrahydrophthalic anhydride and hydrogenated naphthalene-dicarboxylic acid, as well as derivatives thereof. One of these alicyclic dicarboxylic acid or two or more thereof may be used. Among them, 1,4-cyclohexane-dicarboxylic acid or tetrahydrophthalic anhydride is preferred. It is more preferred to use both of 1,4-cyclohexane-dicarboxylic acid and tetrahydrophthalic anhydride in combination. When both of 1,4-cyclohexane-dicarboxylic acid and tetrahydrophthalic anhydride are used in combination, molar ratio of 1,4-cyclohexane-dicarboxylic acid and tetrahydrophthalic anhydride (1,4-cyclohexane-dicarboxylic acid/tetrahydrophthalic anhydride) is preferred to be 90 to 50/10 to 50, and more preferred to be 80 to 60/20 to 40.

In the copolymerized polyester of the present invention, the polyvalent carboxylic acid component other than alicyclic polyvalent carboxylic acid component is preferred to be an aromatic polyvalent carboxylic acid or an aliphatic polyvalent carboxylic acid, and is more preferred to be an aromatic dicarboxylic acid or an aliphatic dicarboxylic acid. When the polyvalent carboxylic acid component other than the aromatic polyvalent carboxylic acid or the aliphatic polyvalent carboxylic acid is contained as the copolymerization component, storage stability of the water dispersion may become low. In 100% by mole of the total content of the polyvalent carboxylic acid component, a sum of the aromatic polyvalent carboxylic acid and the aliphatic polyvalent carboxylic acid is 50% by mole or less. This sum is preferred to be 40% by mole or less, more preferred to be 30% by mole or less, further preferred to be 20% by mole or less, and particularly preferred to be 10% by mole or less. It may be even 0% by mole.

Although the aromatic dicarboxylic acid constituting copolymerized polyester of the present invention is not particularly limited, there may be exemplified terephthalic acid, isophthalic acid, orthophthalic acid, naphthalenedicarboxylic acid, 4,4'-dicarboxy-biphenyl, 5-sodium sulfoisophthalate and derivatives thereof (dimethyl terephthalate, dimethyl isophthalate). Among them, terephthalic acid and isophthalic acid are preferred. Although the aliphatic dicarboxylic acid is not particularly limited, there may be exemplified succinic acid, glutaric acid, adipic acid, pimelic acid, suberic acid, azelaic acid, sebacic acid and derivatives thereof (dimethyl adipate, dimethyl sebacate). Among them, adipic acid is preferred.

It is necessary that the acid value of the copolymerized polyester of the present invention is 170 to 1000 equivalents/$10^6$ g. When the resin acid value of the copolymerized polyester is 170 to 1000 equivalents/$10^6$ g, it is possible to enhance water dispersibility and water-resistant adhesion. Also, stability of the water dispersion and water resistance are improved. Accordingly, the copolymerized polyester of the present invention can be used for the applications which require durability. The acid value is preferred to be 200 equivalents/$10^6$ g or more, and more preferred to be 300 equivalents/$10^6$ g or more. When the acid value is 170 equivalents/$10^6$ g or more, stability of the water dispersion of the copolymerized polyester becomes good. The acid value is also preferred to be 800 equivalents/$10^6$ g or less, and more preferred to be 600 equivalents/$10^6$ g or less. When the acid value is 1000 equivalents/$10^6$ g or less, water-resistant adhesion is improved. Accordingly, the copolymerized polyester of the present invention becomes suitable for the applications which require durability.

Although the polyhydric alcohol constituting the copolymerized polyester of the present invention is not particularly limited, there may be used a glycol component such as ethylene glycol, 1,2-propanediol, 1,3-propanediol, 1,2-butanediol, 1,3-butanediol, 1,4-butanediol, 2-methyl-1,3-propanediol, neopentyl glycol, 1,5-pentanediol, 3-methyl-1,5-pentanediol, 1,6-hexanediol, 1-methyl-1,8-octanediol, 2-methyl-2-ethyl-1,3-propanediol, 2,2-diethyl-1,3-propanediol, 2-ethyl-2-n-propyl-1,3-propanediol, 2,2-di-n-propyl-1,3-propanediol, 2-n-butyl-2-ethyl-1,3-propanediol, 2,2-di-n-butyl-1,3-propanediol, 2,4-diethyl-1,5-pentanediol, 2-ethyl-1,3-hexanediol, 1,4-cyclohexanedimethanol, tricyclodecanedimethanol, a polyalkylene ether glycol component (such as polytetramethylene glycol and polypropylene glycol), glycerol, trimethylolpropane, trimethylolethane, pentaerythritol, α-methylglucose, mannitol and sorbitol. One of them or two or more thereof may be used.

The copolymerized polyester of the present invention is preferred to be copolymerized with a polyvalent carboxylic acid component having three or higher valences and/or a polyhydric alcohol component having three or higher valences. As to the polyvalent carboxylic acid component having three or higher valences, there are exemplified an aromatic carboxylic acid such as trimellitic acid, pyromellitic acid, benzophenone-tetracarboxylic acid, trimesic acid, trimellitic anhydride (TMA) and pyromellitic anhydride (PMDA) and an aliphatic carboxylic acid such as 1,2,3,4-butanetetracarboxylic acid. One of them or two or more thereof may be used. A copolymerization amount of the polyvalent carboxylic acid component having three or higher valences is preferred to be 1% by mole or more, more preferred to be 3% by mole or more, and further preferred to be 5% by mole or more, when the total content of the polyvalent carboxylic acid component is taken as 100% by mole. Further, the copolymerization amount of the polyvalent carboxylic acid component having three or higher valences is preferred to be 30% by mole or less, more preferred to be 20% by mole or less, and further preferred to be 10% by mole or less. When the copolymerization amount of the polyvalent carboxylic acid component having three or higher valences is more than 30% by mole, gelling may happen during the polymerization. As to the polyhydric alcohol component having three or higher valences, there are exemplified glycerol, trimethylolpropane, trimethylolethane, pentaerythritol, α-methylglucose, mannitol and sorbitol. One of them or two or more thereof may be used among them. A copolymerization amount of the polyhydric alcohol component having three or higher valences is preferred to be 10% by mole or more, more preferred to be 15% by mole or more, further preferred to be 20% by mole or more, and particularly preferred to be 30% by mole or more, when the total content of the polyhydric alcohol component is taken as 100% by mole. Further, the copolymerization amount of the polyhydric alcohol component having three or higher valences is preferred to be 50% by mole or less, and more preferred to be 40% by mole or less. When the copolymerization amount(s) of the polyvalent carboxylic acid component having three or higher valences and/or the polyhydric alcohol component having three or higher valences are/is within the above range, the copolymerized polyester can be provided with a proper amount of branches. As a result, storage stability of the water dispersion of copolymerized polyester and water-resistant adhesion become good. On the other hand, when the copolymerization amount of the polyhydric alcohol component is more than 50% by mole, gelling may happen during the polymerization.

The glass transition temperature of the copolymerized polyester of the present invention is preferred to be 5° C. or less, more preferred to be 0° C. or less, further preferred to be −10° C. or less, and particularly preferred to be −20° C. or less. As a result of making the glass transition temperature within the range of 5° C. or less, both good leveling property of the coat and processability can be achieved.

The number-average molecular weight of the copolymerized polyester of the present invention is preferred to be 10000 or less, and more preferred to be 6000 or less. Further, the number-average molecular weight of the copolymerized polyester of the present invention is preferred to be 1000 or more, and more preferred to be 2000 or more. When the number-average molecular weight is within the above range, leveling property becomes good.

As to a polycondensation method for preparing the copolymerized polyester of the present invention, there are exemplified (1) a method wherein a polyvalent carboxylic acid and a polyhydric alcohol are heated in the presence of a known catalyst and, after a dehydrating esterification step, a polycondensation reaction is conducted together with removal of the polyhydric alcohol, (2) a method wherein an alcohol ester of a polyvalent carboxylic acid and a polyhydric alcohol are heated in the presence of a known catalyst and, after a transesterification, a polycondensation reaction is conducted together with removal of the polyhydric alcohol, and (3) a method for conducting depolymerization. In the above methods (1) and (2), a part or all of the acid component may be substituted with an acid anhydride.

In the preparation of the copolymerized polyester of the present invention, it is possible to use a known polymerization catalyst such as a titanium compound (e.g., tetra-n-butyl titanate, tetraisopropyl titanate and titanium oxyacetylacetonate), an antimony compound (e.g., antimony trioxide and tributoxy antimony), a germanium compound (e.g., germanium oxide and tetra-n-butoxy germanium) and acetates of magnesium, iron, zinc, manganese, cobalt, aluminum, etc. One of them or two or more thereof may be used.

As to a method for increasing the acid value of the copolymerized polyester of the present invention, there are exemplified (1) a method wherein, after completion of the polycondensation reaction, a polyvalent carboxylic acid having three or higher valences and/or a polyvalent carboxylic acid anhydride having three or higher valences are/is added and reacted therewith (acid addition), and (2) a method wherein, during the polycondensation reaction, heat, oxygen, water, etc. are reacted thereon so as to intentionally modify the resin. These methods may be conducted optionally. As to the polyvalent carboxylic acid anhydride used for acid addition in the above acid-addition method, there is no particular limitation and there may be exemplified phthalic anhydride, tetrahydrophthalic anhydride, succinic anhydride, maleic acid anhydride, trimellitic anhydride, pyromellitic anhydride, hexahydro-phthalic anhydride, 3,3,4,4-benzophenonetetracarboxylic dianhydride, 3,3,4,4- biphenyltetracarboxylic dianhydride and ethylene glycol bisanhydrotrimellitate. One of them or two or more thereof may be used. Among them, trimellitic anhydride is preferred.

The polyvalent carboxylic acid component having three or higher valences and/or the polyvalent carboxylic acid component anhydride having three or higher valences used in the acid addition are not included in the calculation when the polyvalent carboxylic acid component is taken as 100% by mole.

<Water Dispersion>

The water dispersion of the present invention is a composition containing the above copolymerized polyester and water. Preferably, it is a composition prepared by dispersing the copolymerized polyester in the organic solvent and water. As to the organic solvent, a hydrophilic organic solvent is preferred, and there are exemplified an alcohol (such as methanol, ethanol, isopropanol and 2-ethylhexanol), an ether (such as n-butyl cellosolve, t-butyl cellosolve, propylene glycol monomethyl ether and dipropylene glycol monomethyl ether) and a glycol (such as ethylene glycol, diethylene glycol, triethylene glycol, propylene glycol, dipropylene glycol, tripropylene glycol, 2-methyl-1,3-propanediol and 1,4-butanediol). It is also possible to use a ketone such as cyclohexanone and isophorone having low hydrophilicity provided that it is not separated out in preparing the water dispersion. They may be freely selected and compounded by taking solubility, evaporation rate (drying property), etc. into consideration. Among the above, an ether is preferred and a glycol ether type is more preferred. A compounding amount of the organic solvent to 100 parts by mass of the copolymerized polyester is preferred to be 20 parts by mass or more. When the compounding amount of the organic solvent is within the above range, storage stability for a long period becomes good. A solid content of the water dispersion is preferred to be 45 parts by mass or less. When the solid content of the water dispersion is within the above range, workability becomes good.

In the copolymerized polyester of the present invention, it is possible that an acid component in the copolymerized polyester is neutralized with a base component so as to form a neutralized salt. As to the base component which can be used therefor, it is not particularly limited but can be freely selected from an alkali metal salt (such as lithium hydroxide, sodium hydroxide and potassium hydroxide), ammonia, an organic amine (such as monoethanolamine, triethylamine, dimethylaminoethanol and diazabicyclo-undecene) and the like. When the copolymerized polyester is in the form of the neutralized salt, it is possible to use the copolymerized polyester as a water dispersion having good storage stability. A compounding amount of the base component to 100 parts by mass of the copolymerized polyester is preferred to be 1 part by mass or more, more preferred to be 1.5 parts by mass or more, and further preferred to be 2 parts by mass or more. This compounding amount is preferred to be 5 parts by mass or less, more preferred to be 4 parts by mass or less, and further preferred to be 3 parts by mass or less.

EXAMPLES

Hereinafter, the present invention will be specifically illustrated by referring to Examples. The term simply reading "part (s)" in Examples and Comparative Examples stands for that/those by mass.

(1) Measurement of the Composition of the Copolymerized Polyester

Quantitative determination of molar ratio of the polyvalent carboxylic acid component to the polyhydric alcohol component constituting the copolymerized polyester was conducted using a $^1$H-nuclear magnetic resonance spectrum apparatus (hereinafter, it will be sometimes referred to as an NMR) of 400 MHz. Deuterated chloroform was used as a solvent. When the acid value of the copolymerized polyester was increased by after-addition of acid, the molar ratio of each component was calculated in such a prerequisite that the total content of the acid components other than that used for the after-addition of acid was taken as 100% by mole.

(2) Measurement of the Number-Average Molecular Weight of the Copolymerized Polyester After a sample (the copolymerized polyester) (4 mg) was dissolved in 4 mL of tetrahydrofuran, it was filtered through a membrane filter of 0.2 μm pore size being made of polyethylene tetrafluoride. The filtrate was used as a sample solution and analyzed by gel permeation chromatography (GPC). TOSOH HLC-8220 was used as an apparatus, a differential refractive index detector was used as a detector, and tetrahydrofuran was used as a mobile phase. The measurement was conducted in a flow rate of 1 mL/minute and at a column temperature of 40° C. As to the columns, there were used KF-802, 804L and 806L manufactured by Showa Denko. These columns were arranged in series. As to the standard for molecular weight, a monodispersed polystyrene was used. The number-average molecular weight was determined as a value converted into the standard polystyrene. Calculation was conducted by omitting the part corresponding to the molecular weight of less than 1000.

(3) Measurement of the Glass Transition Temperature

The glass transition temperature was measured using a differential scanning calorimeter (SII, DSC-200). A sample (the copolymerized polyester) (5 mg) was placed in an aluminum container of a pushing cover type, tightly sealed and cooled down to −50° C. using liquid nitrogen. After that, the temperature was raised up to 150° C. at a rate of 20° C./minute. In an endothermic curve obtained during the temperature raising process, a temperature at a crossing point of an extended line of a base line before an endothermic peak appeared (being not higher than the glass transition temperature) with a tangent directed to the endothermic peak (a tangent showing the maximum inclination between a rising part of the peak and a top point of the peak) was adopted as the glass transition temperature (Tg, unit: ° C.).

(4) Measurement of the Acid Value

A sample (the copolymerized polyester) (0.2 g) was precisely weighed and dissolved in 40 ml of chloroform. It was then titrated with a 0.01N ethanolic solution of potassium hydroxide. Phenolphthalein was used as an indicator. Potassium hydroxide equivalent to the sample was determined. The determined value was converted into an equivalent per $10^6$ g of the sample. "Equivalent(s)/$10^6$ g" was used as a unit of the acid value.

(5) Measurement of the Reduced Viscosity ηsp/c (dl/g)

A sample (the copolymerized polyester) (0.1±0.005 g) was dissolved in 25 cc of a mixed solvent of phenol/tetrachloroethane (weight ratio: 6/4). The reduced viscosity of this solution was measured at 30° C. using an Ubbelohde viscometer.

Hereinafter, there will be shown preparation examples of the copolymerized polyesters of the present invention and of copolymerized polyesters of Comparative Examples.

Preparation Example of Copolymerized Polyester (a1)

Into a reaction container equipped with stirrer, condenser and thermometer, there were charged 453 parts of 1,4-cyclohexane-dicarboxylic acid, 174 parts of tetrahydrophthalic anhydride, 113 parts of trimethylolpropane, 566 parts of 1,6-hexanediol and 0.03% by mole (to the total content of the acid components) of tetrabutyl ortho-titanate as a catalyst. They were heated during 4 hours from 160° C. to 220° C. to conduct an esterification reaction via a dehydrating step. After that, a pressure of an inner system was reduced to 5 mmHg during 20 minutes followed by heating up to 250° C. for a polycondensation reaction. Then, the pressure was reduced to 0.3 mmHg or less followed by conducting a polycondensation reaction for 60 minutes. After that, the reaction mixture was cooled down to 180° C. and 30 parts of trimellitic anhydride was poured thereto followed by conducting the reaction for 30 minutes. The reaction product was taken out. As a result of the composition analysis by NMR, a composition of the resulting copolymerized polyester (a1) in terms of molar ratio was 1,4-cyclohexane-dicarboxylic acid/tetrahydrophthalic anhydride/trimethylolpropane/1,6-hexanediol=70/30/15/85. The number-average molecular weight was 6000, the glass transition temperature was −20° C. and the acid value was 396 equivalents/$10^6$ g. The result is shown in Table 1.

Preparation Examples of Copolymerized Polyesters (a2) to (a15)

In accordance with the preparation example of the copolymerized polyester (a1), types and compounding ratios of the materials were changed whereupon the copolymerized polyesters (a2) to (a15) were synthesized. The results are shown in Table 1.

Preparation Example of Water Dispersion (b1)

The above copolymerized polyester (a1) (500 parts) was dissolved in 188 parts of n-butyl cellosolve and, after addition of 13 parts of dimethylaminoethanol thereto, 549 parts of ion-exchange water was added to give the water dispersion (b1). The result is shown in Table 1.

Preparation Examples of Water Dispersions (b2) to (b15)

In accordance with the preparation example of the water dispersion (b1), types and compounding ratios of the materials were changed whereupon the water dispersions (b2) to (b15) of the present invention were prepared. The results are shown in Table 1.

TABLE 1

|  |  | Examples |  |  |  |  |  |  |  |
|  |  | Example 1 | Example 2 | Example 3 | Example 4 | Example 5 | Example 6 | Example 7 | Example 8 |
|---|---|---|---|---|---|---|---|---|---|
|  | copolymerized polyester | a1 | a2 | a3 | a4 | a5 | a6 | a7 | a8 |
| polyvalent carboxylic acid component | terephthalic acid |  |  |  |  |  |  |  |  |
|  | isophthalic acid |  |  |  |  |  |  |  | 30 |
|  | 1,4-cyclohexane-dicarboxylic acid | 70 | 70 | 70 | 67 | 67 | 67 | 67 | 50 |
|  | tetrahydrophthalic anhydride | 30 | 30 | 30 | 30 | 30 | 30 | 30 |  |
|  | adipic acid |  |  |  |  |  |  |  | 20 |

TABLE 1-continued

|  |  |  |  |  |  |  |  |  |  |
|---|---|---|---|---|---|---|---|---|---|
|  | trimellitic acid |  |  |  | 3 | 3 | 3 | 3 |  |
| polyhydric | BEPG |  |  | 35 |  |  |  |  | 35 |
| alcohol | trimethylolpropane | 15 | 15 | 15 |  |  |  | 15 | 15 |
| component | 2-methyl-1,3-propanediol |  |  | 50 |  |  |  |  | 50 |
|  | 1,6-hexanediol | 85 | 85 |  | 80 | 80 | 80 | 65 |  |
|  | neopentyl glycol |  |  |  | 20 | 20 | 20 | 20 |  |
| acid addition | acid addition TMA | 5 | 5 | 7 | 5 | 12 | 5 | 5 | 7 |
| property | number-average molecular weight | 6000 | 12000 | 3800 | 3600 | 2700 | 10000 | 3700 | 3600 |
|  | acid value (equivalents/10⁶ g) | 396 | 400 | 460 | 261 | 721 | 250 | 250 | 477 |
|  | glass transition temperature (° C.) | −20 | −15 | 14 | −26 | −24 | −12 | −15 | 4 |
|  | reduced viscosity (dl/g) | 0.32 | 0.65 | 0.2 | 0.19 | 0.14 | 0.50 | 0.20 | 0.19 |
|  | water dispersion | b1 | b2 | b3 | b4 | b5 | b6 | b7 | b8 |
|  | stability of water dispersion (5° C.) | ○ | ○ | ○ | ○ | ○ | ○ | ○ | ○ |
|  | stability of water dispersion (25° C.) | ○ | ○ | ○ | ○ | ○ | Δ | ○ | ○ |
|  | aqueous paint | A1 | A2 | A3 | A4 | A5 | A6 | A7 | A8 |
|  | water-resistant adhesion | ○○ | ○○ | ○○ | Δ | Δ | Δ | ○○ | ○○ |
|  | processability | ○ | ○ | Δ | ○ | ○ | ○ | ○ | Δ |
|  | weathering resistance | ○○ | ○○ | ○○ | ○○ | ○○ | ○○ | ○○ | ○ |
|  | leveling property | ○ | Δ | ○ | ○ | ○ | ○ | ○ | ○ |

|  |  | Examples/Comparative Examples | | | | | | |
|---|---|---|---|---|---|---|---|---|
|  |  | Example 9 | Example 10 | Example 11 | Comparative Example 1 | Comparative Example 2 | Comparative Example 3 | Comparative Example 4 |
|  | copolymerized polyester | a9 | a10 | a11 | a12 | a13 | a14 | a15 |
| polyvalent | terephthalic acid |  |  |  | 30 |  |  |  |
| carboxylic | isophthalic acid | 30 | 30 |  | 67 |  |  |  |
| acid component | 1,4-cyclohexane-dicarboxylic acid | 50 | 50 | 70 |  |  | 70 | 70 |
|  | tetrahydrophthalic anhydride |  |  |  |  | 30 | 30 | 30 |
|  | adipic acid | 20 | 20 | 30 |  | 70 |  |  |
|  | trimellitic acid |  |  |  | 3 |  |  |  |
| polyhydric | BEPG | 35 | 35 | 70 |  |  |  |  |
| alcohol | trimethylolpropane | 15 | 15 | 30 |  | 20 | 15 | 15 |
| component | 2-methyl-1,3-propanediol | 50 | 50 |  |  |  |  |  |
|  | 1,6-hexanediol |  |  |  | 80 | 80 | 85 | 85 |
|  | neopentyl glycol |  |  |  | 20 |  |  |  |
| acid addition | acid addition TMA | 3 | 14 | 9 | 5 | 3 | 2 | 15 |
| property | number-average molecular weight | 3900 | 3900 | 5700 | 5000 | 3800 | 6000 | 6000 |
|  | acid value (equivalents/10⁶ g) | 170 | 1000 | 522 | 340 | 249 | 150 | 1050 |
|  | glass transition temperature (° C.) | 4 | 5 | −2 | −11 | −54 | −20 | −20 |
|  | reduced viscosity (dl/g) | 0.19 | 0.19 | 0.26 | 0.20 | 0.24 | 0.32 | 0.32 |
|  | water dispersion | b9 | b10 | b11 | b12 | b13 | b14 | b15 |
|  | stability of water dispersion (5° C.) | ○ | ○ | ○ | ○ | ○ | x | ○ |
|  | stability of water dispersion (25° C.) | Δ | ○ | ○ | ○ | Δ | x | ○ |
|  | aqueous paint | A9 | A10 | A11 | A12 | A13 | A14 | A15 |
|  | water-resistant adhesion | ○○ | Δ | ○ | x | ○○ | x | x |
|  | processability | Δ | Δ | Δ | x | ○ | x | ○ |
|  | weathering resistance | ○ | ○ | ○ | x | x | ○○ | ○○ |
|  | leveling property | ○ | ○ | ○ | ○ | ○ | ○ | ○ |

Evaluation of the Water Dispersion (Storage Stability)

The water dispersions (b1) to (b15) of polyester were allowed to stand at 5° C. or 25° C. for three months. Changes in a solution viscosity at each temperature were checked. When a rise in the viscosity is small, the storage stability is good. The solution viscosity was measured in such a manner that the water dispersion of polyester was filled in a glass container followed by measuring at 25° C. using a BL-type viscometer manufactured by Toki Sangyo. A rotation rate was set to be 30 rpm.
Evaluation Criteria:

Width of the changes in solution viscosity=|(Solution viscosity after being allowed to stand)/(Solution viscosity before being allowed to stand)|

○: Width of the changes in solution viscosity≤100%
Δ: Width of the changes in solution viscosity>100%
x: The solution was solidified.

(Leveling Property)

The water dispersions (b1) to (b15) of polyester immediately after the synthesis were heated with stirring, so as to evaporate the solvent to such an extent that the solid content reaches 50% by mass. Then, a viscosity of the solution was measured by a viscometer of cone-plate type (HBDV-II+P CP, manufactured by BROOKFIELD). When the solution viscosity at the solid content of 50% by mass is low, the leveling property is good.
Evaluation Criteria:
○: 500 Pa·s or less
Δ: more than 500 Pa·s and 1000 Pa·s or less
x: more than 1000 Pa·s Example 1 (Preparation of Aqueous Paint)

Titanium oxide (CR-93 manufactured by Ishihara Sangyo) (100 parts), 179 parts of ion-exchange water and 289 parts of glass beads were placed in a glass container and dispersed by a shaker for 6 hours to give a pigment paste (X). After that, 100 parts of the water dispersion (b1), 11 parts of melamine resin (Cymel (registered trademark) 327: Allnex), 140 parts of the pigment paste (X) and 0.3 part of leveling agent (BYK (registered trademark)—381: BYK) were compounded in the container followed by stirring to give the aqueous paint (A1).

Examples 2 to 11 and Comparative Examples 1 to 4

(Preparation of Aqueous Paints (A2) to (A15))

The aqueous paints (A2) to (A15) of Examples or Comparative Examples of the present invention were prepared by the same method as for the aqueous paint (A1).

Evaluation of Coated Metal Plate (Preparation of Test Piece)

The aqueous paints prepared in the above Examples and Comparative Examples were applied onto a Bonde (registered trademark) steel plate in 0.5 mm thickness so as to make the film thickness after drying 12 μm followed by drying at 250° C. for 50 seconds to give the test piece of the coated metal plate.

(Processability)

Using the test piece of the coated metal plate, a 180° bending test was conducted at 25° C., under a condition wherein the coated surface was arranged outside. Cracks of the coat were checked by naked eye. For example, "2T" means that no crack of the coat was generated when the test piece was bent under a condition wherein two metal plates in the same thickness as the test piece were sandwiched in the bent part. When the figure is small, flexing property is good.

Evaluation Criteria:
 ○: 1T or better
 Δ: 2 to 3T
 x: 4T or worse (Water-Resistant Adhesion)

An end part of the test piece of the coated metal plate was protected by a tape. Then, the test piece was immersed for 24 hours in warm water of 95° C. After the immersion, crosscuts were formed in a grid pattern of 1 mm intervals on the coat of the test piece so as to reach the material whereby 100 grids of 1 mm×1 mm size were prepared. An adhesive cellophane tape was adhered onto a surface thereof and was quickly peeled off at 20° C. A number of the grid coats remaining after the peeling-off was checked.

Evaluation Criteria:
 ○○: 80 or more of the grid coats were remained.
 ○: 30 to 79 of the grid coats were remained.
 Δ: 39 to 78 of the grid coats were remained.
 x: 38 or less of the grid coats were remained.

(Weathering Resistance)

The test piece of the coated metal plate was irradiated with a super UV tester (acceleration test for aging) for 48 hours (48-hour test) (measuring condition: irradiation amount by UV lamp is 100 mW at 50° C. and 50% of humidity). The weathering resistance was evaluated based on a luster-retention rate before and after the 48-hour test. Regarding the luster, a reflection at 60° was measured by GLOSS METER (manufactured by Tokyo Denshoku).

Evaluation Criteria:
 ○○: The luster-retention rate is 90% or more.
 ○: The luster-retention rate is 70% or more and less than 90%.
 Δ: The luster-retention rate is 50% or more and less than 70%.
 x: The luster-retention rate is less than 50%.

INDUSTRIAL APPLICABILITY

The copolymerized polyester and the water dispersion of the present invention are excellent in terms of storage stability, water-resistant adhesion, processability, water resistance, weathering resistance and leveling property. Accordingly, they are useful as a resin for the aqueous paint.

The invention claimed is:

1. A copolymerized polyester comprising a polyvalent carboxylic acid component and a polyhydric alcohol component as copolymerization components,
   wherein the polyhydric alcohol component is at least one selected from the group consisting of ethylene glycol, 1,2-propanediol, 1,3-propanediol, 1,2-butanediol, 1,3-butanediol, 1,4-butanediol, 2-methyl-1,3-propanediol, neopentyl glycol, 1,5-pentanediol, 3-methyl-1,5-pentanediol, 1,6-hexanediol, 1-methyl-1,8-octanediol, 2-methyl-2-ethyl-1,3-propanediol, 2,2-diethyl-1,3-propanediol, 2-ethyl-2-n-propyl-1,3-propanediol, 2,2-di-n-propyl-1,3-propanediol, 2-n-butyl-2-ethyl-1,3-propanediol, 2,2-di-n-butyl-1,3-propanediol, 2,4-diethyl-1,5-pentanediol, 2-ethyl-1,3-hexanediol, 1,4-cyclohexanedimethanol, tricyclodecanedimethanol, polytetramethylene glycol, polypropylene glycol, glycerol, trimethylolpropane, trimethylolethane, pentaerythritol, α-methylglucose, mannitol and sorbitol,
   wherein, when a content of the polyvalent carboxylic acid component is taken as 100% by mole, a content of an alicyclic polyvalent carboxylic acid component is 70% by mole or more,
   wherein the alicyclic polyvalent carboxylic acid component comprises 1,4-cyclohexane-dicarboxylic acid,
   wherein the copolymerized polyester has an acid value of 300 to 800 equivalents/$10^6$ g, and
   wherein a copolymerization amount of the polyhydric alcohol component having three or higher valences is 10% by mole or more and 20% by mole or less, when the total content of the polyhydric alcohol component is taken as 100% by mole.

2. The copolymerized polyester according to claim 1, wherein the alicyclic polyvalent carboxylic acid component further comprises tetrahydrophthalic anhydride.

3. The copolymerized polyester according to claim 1, wherein a glass transition temperature of the copolymerized polyester is 5° C. or lower.

4. The copolymerized polyester according to claim 1, wherein a number-average molecular weight of the copolymerized polyester is 10000 g/mol or less.

5. A water dispersion of copolymerized polyester containing the copolymerized polyester according to claim 1 and water.

6. A water dispersion of copolymerized polyester containing a copolymerized polyester comprising a polyvalent carboxylic acid component and a polyhydric alcohol component as copolymerization components, and water,
   wherein the polyhydric alcohol component is at least one selected from the group consisting of ethylene glycol, 1,2-propanediol, 1,3-propanediol, 1,2-butanediol, 1,3-butanediol, 1,4-butanediol, 2-methyl-1,3-propanediol, neopentyl glycol, 1,5-pentanediol, 3-methyl-1,5-pentanediol, 1,6-hexanediol, 1-methyl-1,8-octanediol, 2-methyl-2-ethyl-1,3-propanediol, 2,2-diethyl-1,3-propanediol, 2-ethyl-2-n-propyl-1,3-propanediol, 2,2-di-n- propyl-1,3-propanediol, 2-n-butyl-2-ethyl-1,3-propanediol, 2,2-di-n-butyl-1,3-propanediol, 2,4-diethyl-1,5-pentanediol, 2-ethyl-1,3-hexanediol, 1,4-cyclohexanedimethanol, tricyclodecanedimethanol, polytetramethylene glycol, polypropylene glycol, glycerol, trimethylolpropane, trimethylolethane, pentaerythritol, α-methylglucose, mannitol and sorbitol, wherein, when a content of the polyvalent carboxylic acid component is taken as 100% by mole, a content of an alicyclic polyvalent carboxylic acid component is 70% by mole or more, wherein the alicyclic polyvalent carboxylic acid component comprises 1,4-cyclohexane-dicarboxylic acid, wherein the copolymerized polyester has an acid value of 300 to 800 equivalents/$10^6$ g, and wherein a copolymerization amount of the polyhydric alcohol component having three or higher valences is 10% by mole or more and 50% by mole or less, when the total content of the polyhydric alcohol component is taken as 100% by mole.

\* \* \* \* \*